US011481758B1

(12) United States Patent
Liu

(10) Patent No.: US 11,481,758 B1
(45) Date of Patent: Oct. 25, 2022

(54) ONLINE PAYMENT SYSTEM VIA EXISTING PAYMENT CHANNEL OF MERCHANTS

(71) Applicant: Alipay Labs (Singapore) Pte. Ltd., Singapore (SG)

(72) Inventor: Zhujie Liu, Zhejiang (CN)

(73) Assignee: Alipay Labs (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/501,912

(22) Filed: Oct. 14, 2021

(51) Int. Cl.
*G06Q 40/00* (2012.01)
*G06Q 20/34* (2012.01)
*G06F 9/451* (2018.01)

(52) U.S. Cl.
CPC .......... *G06Q 20/341* (2013.01); *G06F 9/451* (2018.02); *G06Q 20/354* (2013.01)

(58) Field of Classification Search
CPC ..... G06Q 20/341; G06Q 20/354; G06F 9/451
See application file for complete search history.

(56) References Cited

U.S. PATENT DOCUMENTS

| 9,117,242 | B1 * | 8/2015 | Ellis .................. G06Q 40/00 |
| 9,355,392 | B2 * | 5/2016 | Blackhurst ......... G06Q 20/363 |
| 10,395,234 | B1 * | 8/2019 | Greenwald .......... G06Q 20/36 |
| 2011/0106698 | A1 * | 5/2011 | Isaacson ............. G06Q 30/02 |
| | | | 705/41 |
| 2011/0112919 | A1 * | 5/2011 | Gray .................. G06Q 20/204 |
| | | | 705/17 |
| 2011/0218868 | A1 * | 9/2011 | Young ................ G06Q 30/02 |
| | | | 705/16 |
| 2012/0323765 | A1 * | 12/2012 | Spaulding .......... G06Q 20/2295 |
| | | | 705/39 |
| 2013/0254008 | A1 * | 9/2013 | Ovick ............... G06Q 30/0225 |
| | | | 705/14.26 |

(Continued)

FOREIGN PATENT DOCUMENTS

| WO | WO-9849658 A1 * | 11/1998 | ............ G06Q 20/02 |
| WO | WO-2021002850 A1 * | 1/2021 | ........... G06Q 20/346 |

OTHER PUBLICATIONS

Preuveneers et al., "Feature-based Variability Management for Scalable Enterprise Applications: Experiences with an E-Payment Case," 2016 49th Hawaii International Conference on System Sciences, IEEE, 2016 (Year: 2016).*

(Continued)

*Primary Examiner* — Alexander G Kalinowski
*Assistant Examiner* — William B. Bunker
(74) *Attorney, Agent, or Firm* — Seed IP Law Group LLP

(57) ABSTRACT

Implementations of the present specification provide techniques for transacting a stored value card for payment in a separate transaction between a user and a merchant. A stored value card of a card issuer applicable to the transaction between a user and a merchant is determined. An SVC graphics interface for transacting the stored value card is presented to the user, which corresponds to a merchant graphics interface for the transaction between the user and the merchant. The SVC graphics interface enables a transaction on the stored value card using an account of the user with a payment system. An identification information of the stored value card transacted through the SVC graphics interface is inserted onto the merchant graphics interface so that the SVC card is used in the payment for the transaction between the user and the merchant.

20 Claims, 4 Drawing Sheets

(56) References Cited

U.S. PATENT DOCUMENTS

| | | | | |
|---|---|---|---|---|
| 2014/0114842 | A1* | 4/2014 | Blackhurst | G06Q 30/06 705/39 |
| 2015/0348018 | A1* | 12/2015 | Campos | G06Q 20/3278 705/41 |
| 2018/0068313 | A1* | 3/2018 | Van Os | G06Q 20/227 |
| 2020/0104829 | A1* | 4/2020 | Arora | G06Q 20/202 |
| 2020/0258084 | A1* | 8/2020 | Henderson | G06Q 20/384 |
| 2020/0349557 | A1* | 11/2020 | Jivraj | G06Q 20/341 |

OTHER PUBLICATIONS

Anonymous, "Method for point of service 'automatic gift card redemption thank you,'", IP.com No. IPCOM00021817D, 2012 (Year: 2012).*

* cited by examiner

ONLINE PAYMENT SYSTEM VIA EXISTING PAYMENT CHANNEL OF MERCHANTS

BACKGROUND

Technical Field

The present specification relates to the field of computer technologies, and in particular, to electronic payment.

Description of the Related Art

With the development of technologies, mobile payment becomes increasingly popular. In conventional technologies, a payment system may frequently cooperate with local third-party payment institutes to complete a payment. However, many third-party payment related institutes, e.g., issuers, vendors and providers of credit cards, debits cards, and stored value cards (including, e.g., gift cards and loyalty cards) have different processing channels, systems or infrastructures, which do not harmonize or reconcile with one another. An electronic payment transaction involving multiple payment related institutes may include data processing through multiple incompatible channels. For example, a third-party payment institute, e.g., a credit card company, may not be able to extract contents included in a digital object identifier (DOI) provided by a user in an electronic payment transaction. A stored value card issued by a card issuer may not be processed by an electronic payment provider in a payment transaction involving a merchant that accepts the stored value card. Practically, it is not feasible to modify existing infrastructures of third-party payment related institutes or those of the merchants to reconcile with a payment system.

BRIEF SUMMARY

The specification provides techniques for conducting electronic payment transactions involving a stored value card ("SVC") with a payment service provider and at least partially through one or more of a merchant's SVC card processing channels and processing channels of SVC card issuers or vendors. The SVC card issuer or vendor may have a partnership or other business relationship with the payment service provider. The payment service provider provides an SVC card transaction application to function together with the SVC card processing channels of one or more merchants, the card issuer or the card vendor. The SVC transaction application provides a graphics interface coupled to a site of the merchant so that the transaction of the SVC card is readily linked to the transaction on the merchant's site using the SVC card. In some implementations, the SVC transaction application provides a web browser extension that modifies an online shopping website or webpage of a merchant, which presents contents and user interface for transactions on SVC cards. In some implementations, the SVC transaction application provides a mini-program embedded in a "super" payment application of the payment service provider. The mini-program is configured to provide a web browser to access the online shopping website of a merchant, and to provide the content and user interface for the transactions of SVC cards. The SVC transaction application is linked to user's account or e-wallet with the payment service provider and uses cashier payment or auto debit functionality for the user to purchase or add value to an SVC card.

In some implementations, the SVC transaction application detects or determines, e.g., through the transaction channel of a merchant, whether the merchant partners or cooperates with an SVC vendor or an SVC issuer on using SVC cards in transactions. For example, the SVC transaction application detects whether a merchant accepts a gift card issued by a gift card issuer in payments. The SVC transaction application also detects details of the use of the gift card with the merchant, e.g., the percentage of discount provided by one or more merchants or the gift card issuer for using the gift card with the merchant. Upon determining the SVC cards accepted by the merchant, the SVC transaction application presents the SVC cards for the user to purchase through the graphics interface for the SVC card transaction. The SVC transaction application automatically extracts the payment amount of the transaction between the user and the merchant and fills the payment amount into the card value of the SVC card. The SVC transaction application may also use the extracted payment amount as an upper limit for the value purchased or added to the SVC card. For example, the SVC transaction application may provide that the purchased value of the SVC card is not greater than the payment amount between the user and the merchant.

A user can purchase an SVC card or add value to an existing SVC card through the graphics interface using the payment application of the payment service provider as a payment option. Other payment options, e.g., through credit card, debit card, other SVC card or the like, are also possible and can be provided as alternative payment options.

After the user completes the SVC card purchase, the card information can be automatically extracted and inserted into suitable sections on the merchant's webpage for the transaction between the user and the merchant as a payment option using the SVC card. For example, the identification information of the SVC card (e.g., card number and pin number) and the value amount of the SVC card can be automatically inserted into proper sections on the merchant transaction webpage. The SVC transaction application also sets a time limit for the user to use or redeem the value of the SVC card through by making payment using the SVC card in the transaction between the user and the merchant. The user is reminded to complete the transaction using the SVC card at merchant's website within the time limit.

If the user does not use the SVC card in the transaction between the user and the merchant within the time limit set by the SVC transaction application, the SVC card will be revoked and the previous transaction of purchasing or adding value to the SVC card will be cancelled. The money will be refunded to the original funding source of the user in account, e.g., an e-wallet, with the payment application.

If the user uses the SVC card in the transaction with the merchant on the merchant's site, the merchant is able to process the payment using the SVC card through the existing channels of the merchant with the issuer or vendor of the SVC card.

At least one technical solution provided in the implementations of the present specification can achieve the following beneficial effects.

The techniques integrate and harmonize the processing of the transaction between a user and a merchant and the transaction between the user and an SVC card issuer or vendor. Information on each of the two transactions can be readily shared and considered in the other one of the two transactions in substantially real time and with no or substantially reduced backend processing. As such, it is more convenient to use an SVC card in a payment operation between the user and the merchant. Also, the processing of the SVC card in the transactions is more timely. For example, a graphics interface for the SVC card transaction is presented as coupled to a graphics interface for the transaction with the merchant. The contents of the two graphics interfaces are presented to the user together to facilitate user's selections. Further, the contents of the two graphics interfaces can be automatically extracted and shared between the two graphics interfaces. As such, even if the processing channels and structures of the transaction with the merchant and the transaction with the SVC card issuer or vendor are different or inconsistent, the techniques harmonize them together seamlessly. Both the merchant and the SVC card vendor/issuer do not need to change their existing system and can enjoy the convenience brought about by the techniques. System or computing resources are thus saved and reduced.

DETAILED DESCRIPTION

Figure 1:
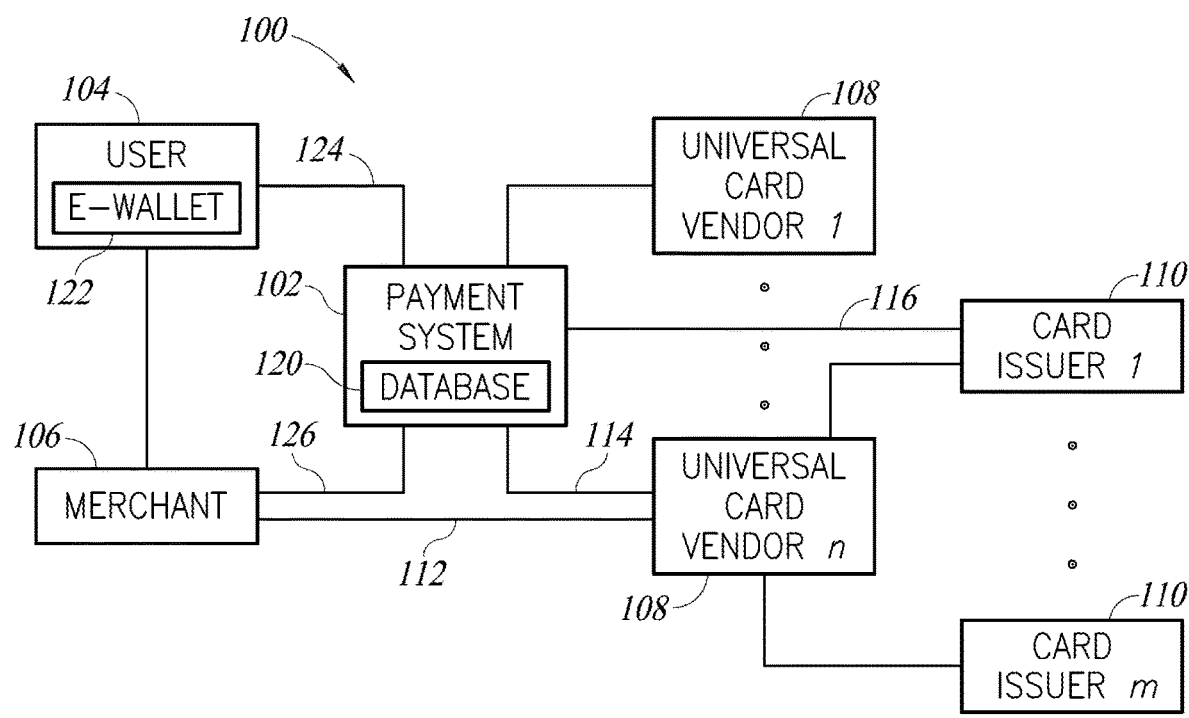
FIG. 1 is a schematic diagram illustrating a system architecture according to an implementation of the present specification.

To make the objectives, technical solutions, and advantages of the present application clearer, the following clearly and comprehensively describes the technical solutions of the present application with reference to specific implementations of the present application and corresponding accompanying drawings. Clearly, the described implementations are only some rather than all of the implementations of the present application. All other implementations obtained by a person of ordinary skill in the art based on the implementations of the present application without creative efforts shall fall within the protection scope of the present application.

The specification provides techniques for conducting electronic payment transactions involving a stored value card ("SVC") with a payment service provider and at least partially through one or more of a merchant's SVC card processing channels and processing channels of SVC card issuers or vendors. The SVC card issuer or vendor may have a partnership or other business relationship with the payment service provider. The payment service provider provides an SVC card transaction application to function together with the SVC card processing channels of one or more merchants, the card issuer or the card vendor. The SVC transaction application provides a graphics interface coupled to a site of the merchant so that the transaction of the SVC card is readily linked to the transaction on the merchant's site using the SVC card. In some implementations, the SVC transaction application provides a web browser extension that modifies an online shopping website or webpage of a merchant, which presents contents and user interface for transactions on SVC cards. In some implementations, the SVC transaction application provides a mini-program embedded in a "super" payment application of the payment service provider. The mini-program is configured to provide a web browser access to the online shopping website of a merchant, and to provide the content and user interface for the transactions of SVC cards. The SVC transaction application is linked to user's account or e-wallet with the payment service provider and uses auto debit functionality for the user to purchase or add value to an SVC card.

In some implementations, the SVC transaction application detects or determines, e.g., through the transaction channel of a merchant, whether the merchant partners or cooperates with an SVC vendor or an SVC issuer on using SVC cards in transactions. For example, the SVC transaction application detects whether a merchant accepts a gift card issued by a gift card issuer in payments. The SVC transaction application also detects details of the use of the gift card with the merchant, e.g., the percentage of discount provided by one or more merchants or the gift card issuer for using the gift card with the merchant. Upon determining the SVC cards accepted by the merchant, the SVC transaction application presents the SVC cards for the user to purchase through the graphics interface for the SVC card transaction. The SVC transaction application automatically extracts the payment amount of the transaction between the user and the merchant and fills the payment amount into the card value of the SVC card. The SVC transaction application may also use the extracted payment amount as an upper limit for the value purchased or added to the SVC card. For example, the SVC transaction application may provide that the purchased value of the SVC card is not greater than the payment amount between the user and the merchant.

A user can purchase an SVC card or add value to an existing SVC card through the graphics interface using the payment application of the payment service provider as a payment option. Other payment options, e.g., through credit card, debit card, other SVC card or the like, are also possible and can be provided as alternative payment options.

After the user completes the SVC card purchase, the card information can be automatically extracted and inserted into suitable sections on the merchant's webpage for the transaction between the user and the merchant as a payment option using the SVC card. For example, the identification information of the SVC card (e.g., card number and pin number) and the value amount of the SVC card can be automatically inserted into proper sections on the merchant transaction webpage. The SVC transaction application also sets a time limit for the user to use or redeem the value of the SVC card through by making payment using the SVC card in the transaction between the user and the merchant. The user is reminded to complete the transaction using the SVC card at merchant's website within the time limit.

If the user does not use the SVC card in the transaction between the user and the merchant within the time limit set by the SVC transaction application, the SVC card will be revoked and the previous transaction of purchasing or adding value to the SVC card will be cancelled. The money will be refunded to the original funding source of the user in account, e.g., an e-wallet, with the payment application.

If the user uses the SVC card in the transaction with the merchant on the merchant's site, the merchant is able to process the payment using the SVC card through the existing channels of the merchant with the issuer or vendor of the SVC card.

FIG. 1 is a schematic diagram illustrating a system 100 according to some implementations of the present specification. In the system 100, a payment system 102 including an SVC transaction application interacts with a user (or users) 104, a merchant (or merchants) 106, one or more universal card vendors 108 (1 to n), and one or more card issuers 110 (1 to m). The payment system 102 partners with the one or more universal card vendors 108 in handling transactions on SVC cards that the one or more universal card vendors 108 operate. The payment system 102 cooperates with the one or more card issuers 110 directly or via one or more universal card vendors 108 in handling transactions on SVC cards that the one or more card issuers 110 operate. The universal card vendor 108 is capable of activating and issuing stored value cards through the card issuers 110, and is capable of communicating the activations, transactions and activities of the SVC cards to the merchant(s) 106 and the payment system 102 through communication gateways 112, 114, respectively. In some implementations, the payment system 102 also communicates directly with one or more card issuers 110 through gateway 116 under a data processing channel of purchasing, activating, and transacting an SVC card issued by the card issuer 110.

The payment system 102 includes a database 120. In some implementations, the database 120 stores information of the universal card vendors 108, information of card issuers 110, and the cooperation relationships between merchants 106 and the universal card vendors 108 and the cooperation relationships between merchants 106 and the card issuers 110, if any. For example, the database 120 stores information about whether a merchant 106 accepts an SVC card of a card issuer 110 in a transaction between a user 104 and the merchant 106 and whether the merchant 106 deals with the card issuer 110 or a universal card vendor 108 in processing, e.g., redeeming, the SVC card. It should be appreciated that the payment system 102 works with multiple merchants 106, and different merchants 106 may have cooperation relationship with different universal card vendors 108 or card issuers 110. In the description herein, a universal card vendor 108 and a card issuer 110 may be referred to together as a card issuer for descriptive purposes, as situation applies. The cooperation relationship between a merchant 106 and a card issuer 108, 110 may vary among the goods or services provided by the merchant 106. The applicability of an SVC card in a transaction between a user 104 and a merchant 106 may also vary with the qualifications of the users 104. The database 120 can store all such variables.

In some implementations, a merchant 106 may also be a card issuer 110 and may cooperate, as a card issuer 110, with the payment system 102 directly or via a respective universal card vendor 108.

The user 104 includes an e-wallet 122. The e-wallet 122 is an account of the user 104 with the payment system 102. The e-wallet 122 includes identification information of the account of the user ("user identifier") with the payment system 102 and source of fund information, e.g., a credit card of the user 104 that is linked to the account of the user with the payment system 102. In some implementations, the e-wallet 122 includes a client application that functions with a server of the payment system 102 to implement payment transactions through the payment system 102. In some implementations, the client application is also part of the payment system 102.

The e-wallet 122 may reside on one or more local user devices used for mobile payment, such as a smartphone or a tablet computer, or a cloud-based remote device or a remote cluster of devices, or include a combination of locally deployed application programs and cloud-based application programs. Part of the e-wallet 122 may reside on a same cloud-based device or cluster of devices as a server of the payment system 102. In some implementations, the payment system 102 provides the programs to a user 104 to implement the e-wallet 122 including the client application. The payment system 102 may provide the application program for deployment on a user device of the user 104 and may provide application program for deployment on a cloud-based server. In some implementations, the cloud-based application program is deployed on a cloud-based server that is managed by the payment system 102. The locally deployment application program and the cloud-based application program are communicatively coupled to one another and function together to implement the e-wallet 122.

In some implementations, the client application of the e-wallet 122 is configured to generate a digital object identifier ("DOI") that includes or reflects the user identifier. A DOI may include various payment barcodes and 2-dimensional ("2D") payment quick response codes ("QR code").

In some implementations, the payment system 102 interacts with the user 104, e.g., through the e-wallet 122 of the user 104, via communication gateway 124. The payment system 102 interacts with the merchant 106 via communication gateway 126.

The user 104 can interact with the merchant 106 through online shopping or through offline shopping at a physical store of the merchant 106. Correspondingly, the e-wallet 122 has various functions configured for online payment or offline payment. For example, in the scenario of offline shopping at a physical store of a merchant 106, the e-wallet 122 is capable of presenting a DOI for a point-of-sale ("POS") terminal to detect the user identifier of the user account with the payment system 102. In a walk out shopping scenario where no checkout is involved, the e-wallet 122 is capable of showing the details of the items picked up by the user 104 through a virtual shopping cart and is capable of identifying the SVC cards that apply to the merchant 106 and/or the items in the virtual shopping cart for payment after the user 104 walks out of the boundary line of checkout free store of the merchant 106.

Figure 2:
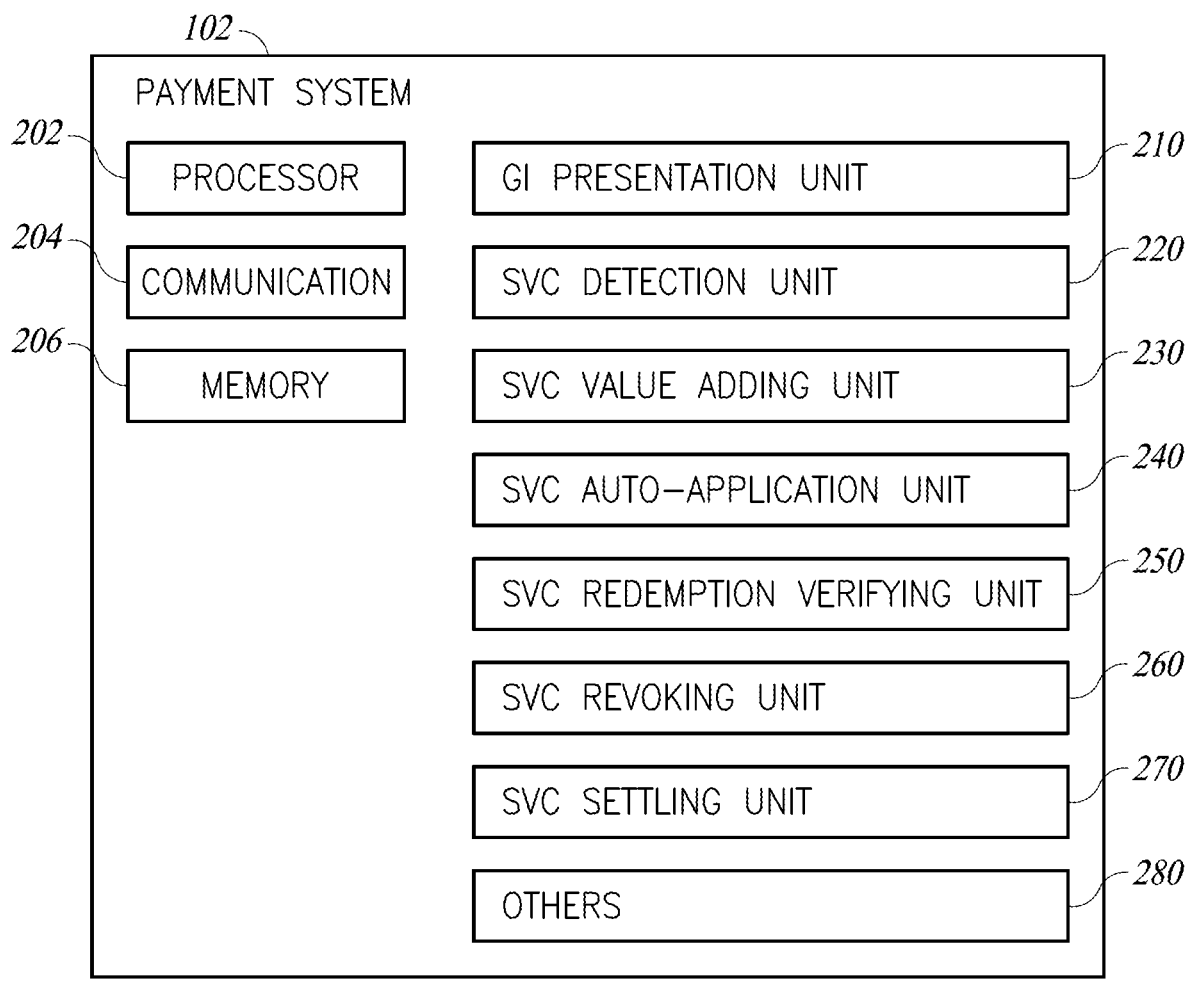
FIG. 2 is a schematic diagram illustrating a payment system according to an implementation of the present specification.

FIG. 2 shows an example payment system 102. As shown in FIG. 2, the payment system 102 includes one or more processors 202, one or more communication units 204, and one or more memory devices or storage units 206. The payment system 102 also includes dedicated action units that implement various actions. Each dedicated action unit includes hardware elements, software elements or a combination of hardware and software elements. The hardware elements include embedded processing circuitry, system on chip, programmable logics like field programmable gate array ("FPGA"), or other hardware implementations of computing. The software elements include computer executable instructions dedicated to implement respective actions, when the computer executable instructions are executable by the processors(s) 202.

In some implementations, the action units include a graphics interface ("GI") presentation unit 210, an SVC detection unit 220, an SVC value adding unit 230, an SVC auto-application unit 240, an SVC redemption verification unit 250, an SVC revoking unit 260, an SVC settling unit 270, and other units 280. The components of the payment system 102 including the action units may be located in a same server or different servers that function together in a distributed computing environment, which are all included in the scope of the specification.

The graphics interface presentation unit 210 is configured to present a graphics interface on a display for transaction of an SVC card through the e-wallet 122 of the user 104. In some implementations, the graphics interface presentation unit 210 presents a first graphics interface for SVC card transaction, which corresponds to a second graphics interface for a transaction between the user 104 and the merchant 106. For example, the first graphics interface enables a transaction of an SVC card to be used for a payment in the transaction between the user 104 and the merchant 106 through the second graphics interface. In some implementations, the first graphics interface is presented to be coupled to the second graphics interface. In the description herein, the first graphics interface for the SVC card transaction is also referred to as "SVC interface" and the second graphics interface for the transaction between the user 104 and the merchant 106 is also referred to as "merchant interface" for descriptive purposes. The SVC interface may be coupled to the merchant interface in various manners. For example, the SVC interface may be presented side by side with the merchant interface, embedded within the merchant interface or floating over the merchant interface, or be coupled to the merchant interface in other manners. For example, the SVC interface and the merchant interface may be shown sequentially or in a rolling manner and may be switched back and forth for the user 104 to interact with each of them, respectively.

Figure 3:
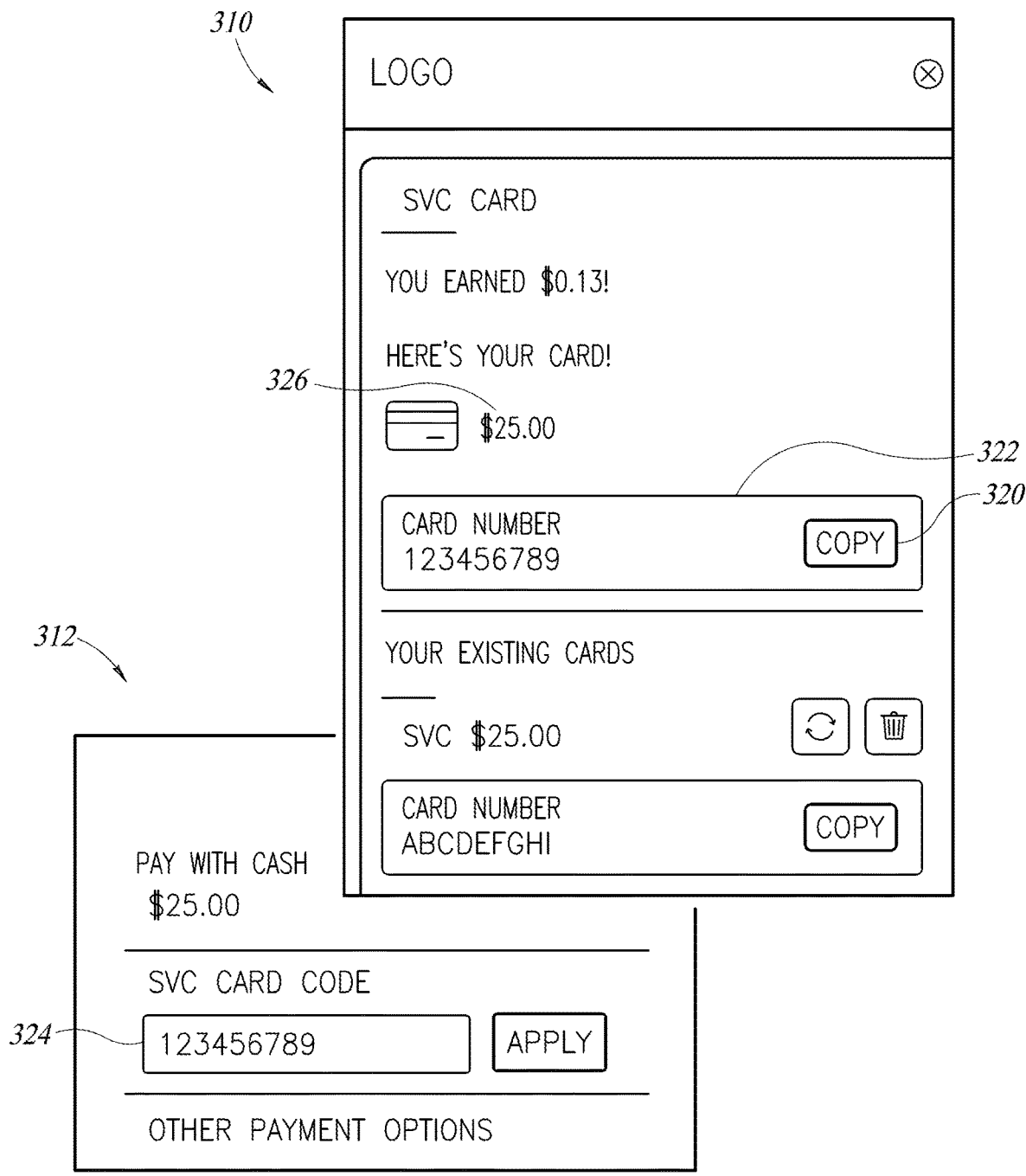
FIG. 3 is an example graphics interface according to an implementation of the present specification.

FIG. 3 shows portions of an example SVC interface 310 coupled to an example merchant interface 312. In this illustrative example, the SVC interface 310 is presented as floating over the merchant interface 312 and is positioned to a side of the merchant interface 312. The SVC interface 310 includes information of the SVC card, e.g., card number, card value, and discount value. In some implementations, the graphics interface presentation unit 210 configures the SVC interface 310 to exchange or share contents or information with the merchant interface 312. In some implementations, the graphics interface presentation unit 210 customizes the SVC interface 310 based on the corresponding merchant interface 312 to enable the content exchange between the SVC interface 310 and the merchant interface 312.

For example, as shown in FIG. 3, the SVC interface 310 includes a user selection feature, "COPY" button 320, in a card number section 322. The "COPY" button 320 is a customized feature of the SVC interface 310. If the user 104 activates the "COPY" button, the card number shown in the card number section 322 will be automatically extracted and inserted into an SVC card code section 324 on the merchant interface 312. In some other customization implementations, the SVC interface 310 does not include this "COPY" button, and the card number shown in the card number section 322 is automatically extracted and inserted into the SVC card code section 324 on the merchant interface 312 without user selection.

The merchant interface 312 may be a graphics interface provided by the merchant 106, e.g., a webpage of a website of the merchant 106 or a graphics interface of a POS device of the merchant 106, may be a graphics interface of the merchant 106 supported by a third party platform, may be a graphics interface customized for the merchant 106 and provided by the payment system 102, or may be other scenarios of a graphics interface corresponding to a transaction between the user 104 and the merchant 106. The merchant interface 312 may be presented through one or more of an Internet applications on a user device of the user 104, or an application on a device of the merchant 106, e.g., a POS terminal of the merchant 106. In some implementations, the merchant interface 312 is presented through both an application on a user device of the user 104 and an application on a device of the merchant 106. The merchant interface 312 presented through the application on the user device may be different from the merchant interface 312 presented through the application on the merchant device in one or more formats or content. The SVC interface 310 may be presented through one or more of an Internet applications on a user device of the user 104, or an application on a device of the merchant 106, e.g., a POS terminal of the merchant 106. In some implementations, the SVC interface 310 is presented through both an application on a user device of the user 104 and an application on a device of the merchant 106. The SVC interface 310 presented through the application on the user device may be different from the SVC interface 310 presented through the application on the merchant device in one or more formats or content.

For example, in a scenario where the user 104 conducts an offline shopping at a physical store of the merchant 106, the merchant interface 312 is presented on a checkout station of the physical store, and the graphics interface presentation unit 210 provides an SVC interface 310 on the checkout station of the physical store, coupled to the merchant interface 312. The SVC interface 310 enables the user 104 to purchase an SVC card that can be used in the payment of the transaction between the user 104 and the merchant 106 through the merchant interface 312. The SVC interface 310 can be implemented through a plug-in module or other suitable approaches to customize the application of the checkout station of the merchant 106.

In a scenario where the user 104 conducts a walk out shopping at a physical store of the merchant 106 without being checked out by a cashier or using a self-checkout station ("checkout-free shopping"), the merchant interface 312 is presented on a user device of the user 104 showing a virtual shopping cart of items that the user 104 purchased from the store, and the graphics interface presentation unit 210 provides an SVC interface 310 coupled to the merchant interface 312 on the user device. In a case where the merchant interface 312 is implemented through an application of the merchant 106, the SVC interface 310 is implemented through a browser plug-in module, a browser extension module or other suitable approaches to customize the application of the merchant 106. In a case where the merchant 312 is implemented through the payment system 102, the SVC interface 310, in some implementations, is implemented through a mini-program of the payment system 102.

In a scenario where the user 104 conducts an online shopping through an online shopping website of the merchant 106, the merchant interface 312 is presented as a webpage of the online shopping website. The SVC interface 310 is implemented through a browser plug-in module, a browser extension module or other suitable approaches to customize a web browser used to access the online shopping website. In some implementations, the payment system 102 includes a mini-program configured to provide a browser to access the online shopping website of the merchant 106, and the graphics interface presentation unit 210 is configured to provide an SVC interface 310 coupled to a webpage accessed through the web browser of the mini-program.

The SVC detection unit 220 is configured to determine an SVC card that is applicable in the transaction between the user 104 and the merchant 106. In some implementations, the SVC detection unit 220 detects the transaction between the user 104 and the merchant 106 and obtains the details of the transaction from one or more users 104 or the merchant 106. The SVC detection unit 220 further determines whether one or more SVC cards are acceptable by the merchant 106 in the transaction and whether one or more SVC cards are applicable to the user 104 in the transaction with the merchant 106. In some implementations, the SVC detection unit 220 checks the database 120 to determine the cooperation relationship between the merchant 106 and one or more universal card vendors 108 and one or more card issuers 110 as stored on the database 120.

In some implementations, the business relationship between a card issuer 108, 110 can be dynamically changed, which is dynamically updated in the database 120. For example, a universal card vendor 108 may manage multiple SVC cards that are used by the merchant 106. For the multiple SVC cards, the details of the cooperation between the universal card vendor 108 and the merchant 106 may also vary among one another and may each change. For example, the merchant 106 may provide different discounts to different SVC cards, and the discount to an SVC card may vary with time. A universal card vendor 108 may also provide various benefits, e.g., loyalty discount, to a user 104. The SVC detection unit 220 detects all the details of the available SVC cards and provides such information to the graphics interface presentation unit 210 for the graphics interface presentation unit 210 to present such information on the SVC interface 310 or to present the SVC interface 310 based on that information.

The SVC value adding unit 230 is configured to automatically obtain the payment amount in the transaction between the user 104 and the merchant 106 and to insert the obtained payment amount onto the SVC interface 310 as a value of the SVC card to be purchased. The value of the SVC card may be a card value of an SVC card to be purchased or may be a value to be added onto an existing SVC card. In some implementations, the SVC value adding unit 230 ensures that the value of an SVC card to be purchased through the SVC interface 310 is not greater than the payment amount or the transaction value of the transaction between the user 104 and the merchant 106. For example, the SVC value adding unit 230 obtains the payment amount at the checkout portion of the merchant interface 312 and inserts the obtained payment amount into a card value portion 326 (FIG. 3) of an SVC card to be purchased or to add value on. In some implementations, the SVC value adding unit 230 determines the factors that contribute to the payment amount shown on the merchant interface 312 and adjusts the payment amount by filtering out factors that contradict with the use of the SVC card in the payment of the transaction between the user 104 and the merchant 106. For example, in a case where the payment amount at a checkout section of the merchant interface 312 includes an exclusive incentive program that precludes the use of an SVC card in making the payment, the SVC value adding unit 230 will remove the effects of the exclusive incentive program in determining the value, e.g., an adjusted payment amount, to be inserted into the card value section of the to-be-purchased SVC card.

The SVC auto-application unit 240 is configured to cause an identification information of the SVC card to be inserted onto the merchant interface 312. In some implementations, the SVC auto-application unit 240 automatically insert the identifier information an SVC card transacted on the SVC interface 310 into an SVC card section on the merchant interface 312. For example, after an SVC card has been purchased through the SVC interface 310, the SVC auto-application unit 240 automatically extracts the card number of the SVC card and inserts the card number into the SVC card code section 324 on the merchant interface 312 as a payment option by the SVC card. In some implementations, because the SVC value adding unit 230 sets the card value of the SVC card to be not greater than the payment amount of the transaction between the user 104 and the merchant 106, the SVC auto-application unit 240 by default applies the whole card value of the SVC card onto the payment on the merchant interface 312. For example, the merchant interface 312 may not show the card value, although the card value of the SVC card is automatically communicated to the merchant 106 or is shared with the merchant interface 312.

In some implementations, the SVC auto-application unit 240 provides a user selection option for the user 104 to affect a selection on whether to use the SVC card in the transaction. For example, as shown on FIG. 3, the example SVC interface 310 includes a "COPY" button 320 beside the SVC card number section 322. By activating the "COPY" button 320, the user 104 selects to use the SVC card in the transaction with the merchant 106, and the card number of the SVC card is inserted in the SVC card number section 324 on the merchant interface 312.

In some implementations, the SVC auto-application unit 240 sets a time limit for the SVC card to be applied or redeemed in the transaction between the user 104 and the merchant 106. For example, the SVC auto-application unit 240 sets a timer of, e.g., three minutes, for the user 104 to use or redeem the SVC card in the transaction with the merchant 106. In some implementations, the starting point of the timer is set as the time point when the SVC card is purchased through the SVC interface 310. In some implementations, the starting point of the timer is set as the time point when the SVC card information is inserted into the respective section(s) in the merchant interface 312. Other approaches to set up the timer are also possible and included in the scope of the specification.

In some implementations, after the SVC auto-application unit 240 has inserted the SVC card information onto the merchant interface 312, it is assumed that the SVC card will be used or redeemed in the transaction between the user 104 and the merchant 106. Any benefits or incentives corresponding to the SVC card will be added into the e-wallet 122 of the user 104.

The SVC redemption verification unit 250 is configured to verify whether the SVC card is redeemed or used within the time limit set by the SVC auto-application unit 240. In some implementations, the payment system 102 has control on the merchant interface 312 or has partnership with the merchant 106 to share the information of the merchant interface 312 such that the SVC redemption verification unit 250 can automatically or directly obtain information regarding whether and when the SVC card is used for payment. In some implementations, the payment system 102 does not directly or automatically obtain information on whether and when the SVC card is used for payment, and the SVC redemption verification unit 250 communicates with the card issuer 108, 110 of the SVC cards to determine whether and when the SVC card is used for payment. For example, the SVC redemption verification unit 250 may wait until the time limit expires and then check with the respective universal card vendor 108 or card issuer 110 to see whether the SVC card has been used or redeemed within the time limit. In some implementations, the SVC redemption verification unit 250 communicates with a card issuer 108, 110 to periodically, e.g., with a time interval similar to the time limit set by the SVC auto-application unit 240, receive update about whether and when the SVC card of the card issuer 108, 110 is used in a transaction between a user 104 and a merchant 106 or is redeemed by the merchant 106.

In some implementations, the SVC redemption verification unit 250 also verifies whether the SVC card is used by the user 104 who purchased the SVC card through the SVC interface 310. If an SVC card is used in a transaction that does not involve the user 104 who purchased the SVC card, a red flag may be attached to the transaction using the SVC card, and the payment system 102 may further investigate whether a fraudulent activity occurs. For example, the payment system 102 may investigate whether the SVC card is used in a transaction of a family member of the user 104 who purchased the SVC card. The payment system 102 may also determine a chain of transfer of the SVC card that has occurred before the SVC card is redeemed.

The SVC revoking unit 260 is configured to revoke an SVC card in response to the SVC card not being used or redeemed in a transaction between a user 104 and a merchant 106 within a time limit set for the SVC card. After the SVC card is revoked, the amount of money or other costs that the user 104 used to purchase the SVC card will be refunded to the e-wallet 122 of the user 104. In some implementations, the revoking the SVC card includes automatically removing the identification information or other information of the SVC card from the merchant interface 312. The information of the revoked card, including the revoked status, may be shown on the SVC interface 310. In some implementations, the SVC revoking unit 260 sends one or more reminder messages to the user 104, e.g., through the SVC interface 310 or through the e-wallet 122. The reminder message reminds the user 104 to use or redeem the SVC card in a transaction with the merchant 106 within the time limit to avoid the SVC card being revoked.

In some implementations, after the SVC card is revoked, the benefits or incentives corresponding to the use or redemption of the SVC card or corresponding to the purchase of the SVC card will be removed from the e-wallet 122.

The SVC settling unit 270 is configured to settle with a card issuer 108, 110 on the cost of the SVC cards of the card issuer 108, 110. In some implementations, the settlement of the SVC costs is conducted periodically. The purchase of an SVC card is conducted with the e-wallet 122 of a user 104, and the SVC card is issued by the card issuer 108, 110. The payment system 102 does not settle the purchase cost with the card issuer 108, 110 in real time. During an interval between two settling time points, a status of an issued SVC card may change. For example, an SVC card may be redeemed, an SVC card may be revoked, and a transaction between a user 104 and a merchant 106 paid using an SVC card may be cancelled or revoked. The SVC settling unit 270 monitors the statuses of SVC cards of a card issuer 108, 110 and settles the cost of the SVC cards with the card issuer 108, 110 based on the statuses of the SVC cards.

Figure 4:
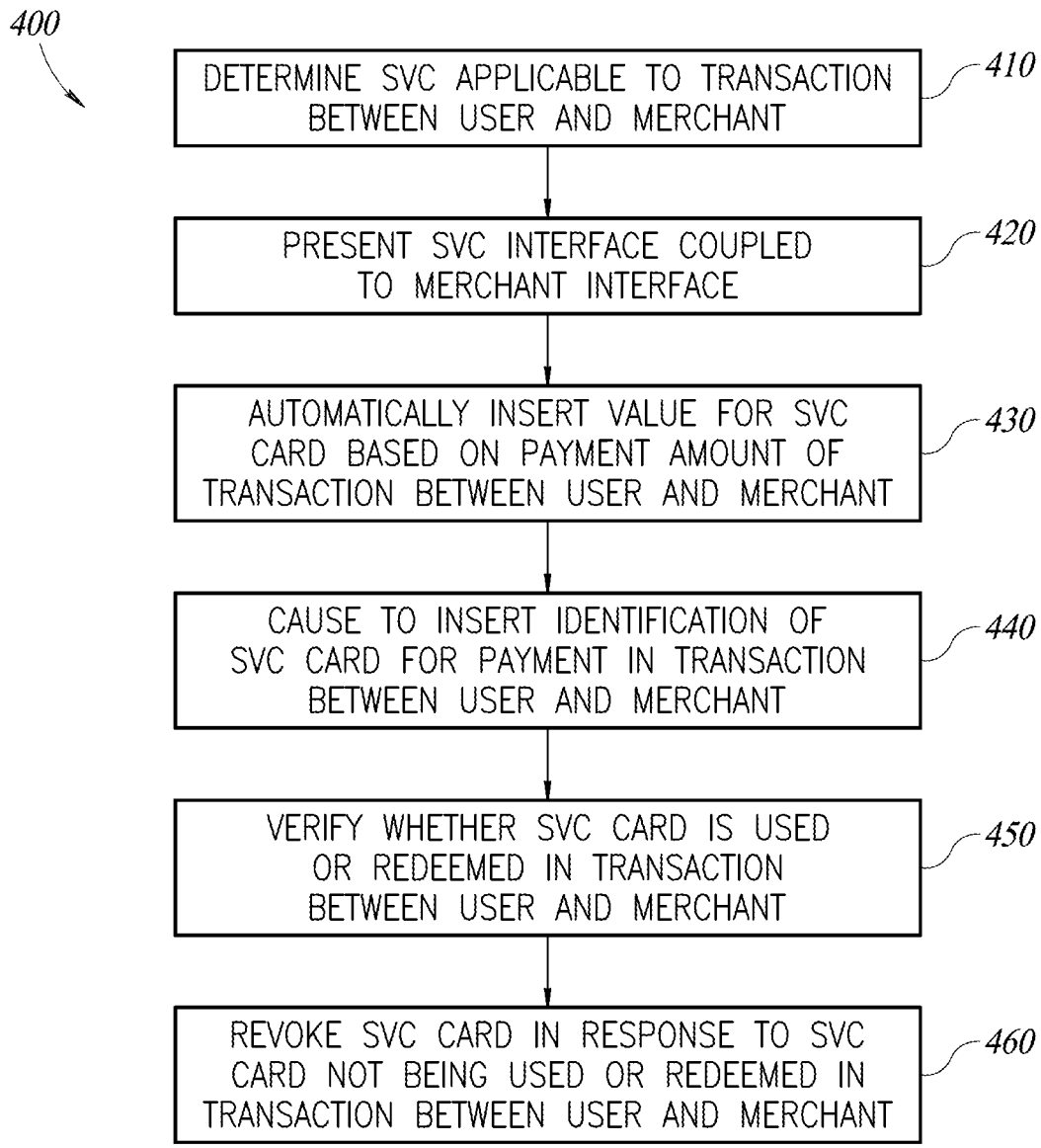
FIG. 4 is a schematic diagram illustrating an example process according to an implementation of the present specification.

FIG. 4 shows an example process 400 of the payment system 102. Referring to FIG. 4, the process 400 of the payment system 102 is described using an example scenario that the payment system 102 provides a mini-program for the SVC transaction for illustrative purposes, which does not limit the scope of the disclosure. In some implementations, the mini-program is provided as a template, which can be customized for different merchants 106. The mini-program provides an entrance to the merchant site. A user 104 can access the mini-program through the e-wallet 122. For example, the mini-program provides a browser for a user 104 to browse a website of a merchant 106 for online shopping. By browsing the online shopping site of the merchant 106 using the browser provided by the mini-program, shown as the merchant interface 312, the user 104 may add items into a virtual shopping cart, and proceed to a checkout page of the merchant web site.

In example operation 410, the SVC detection unit 220 detects one or more SVC cards applicable to the transaction between the user 104 and the merchant 106. The SVC card may be detected based on one or more users 104, the merchant 106 or the items in the transaction between the user 104 and the merchant 106.

In example operation 420, in response to the SVC detection unit 220 detecting one or more SVC cards applicable to the transaction between the user 104 and the merchant 106, the graphics interface presentation unit 210 presents an SVC interface 310 coupled to the merchant interface 312, e.g., the merchant website accessed through the browser of the mini-program. For example, the SVC interface 310 may be first presented as a floating icon indicating that there is one or more SVC cards applicable to the transaction between the user 104 and the merchant 106. Upon the user 104 activating on the floating icon, the SVC interface 310 presents contents for transacting the one or more SVC cards. In some implementations, the SVC interface 310 presents or directs the user 104 to a webpage of card issuer 108, 110 corresponding to the one or more SVC cards for transacting the one or more SVC cards. In some implementations, the SVC interface 310 also presents contents of the e-wallet 122 for purchasing an SVC card and to add the purchased SVC card to the e-wallet 122. The SVC interface 310 also presents information of the one or more SVC cards that are applicable for the transaction between the user 104 and the merchant 106, referred to as "applicable SVC card."

In some implementations, at various stages of the process 400, the SVC interface 310 provides terms and conditions for the user 104 to agree upon to enable the operations of the example process 400 to proceed further.

In example operation 430, the SVC value adding unit 230 automatically inserts value of the applicable SVC card. The inserted value may be a card value of an SVC card to be purchased by the user 104 or a value to be added into an existing SVC card of the user 104. The SVC value adding unit 230 obtains the transaction amount or payment amount from the merchant interface 312, e.g., a merchant webpage shown in the browser of the mini-program, and inserts that amount to a card value section of the SVC card under transaction in the SVC interface 310. Payment amount may be adjusted to remove influences of factors that conflict with the SVC card. For example, in a case where some of the items in the virtual shopping cart is not qualified for payment using SVC cards, the payment amount corresponding to such items will be removed from the value inserted to the SVC card. For example, in a case where the payment amount at the checkout page includes some exclusive incentives that are not used together with SVC cards, the value of the SVC card as automatically inserted by the SVC value adding unit 230, will not reflect the impacts of such exclusive incentives. That is, the value inserted into the value section of the SVC card may be greater than the payment value of the transaction shown on the merchant interface 312 because the payment value shown on the merchant interface 312 includes the exclusive incentives. The payment amount may also be adjusted if the user 104 intends to pay, at least partially, the merchant transaction using another SVC card. The SVC value adding unit 230 monitors the activities that occur through the merchant interface 312 to determine the payment amount or the adjusted payment amount. Further, the SVC value adding unit 230 also updates the value of the SVC card to be purchased or the value to be added into an existing SVC card based on the updated payment amount or updated adjusted payment amount.

In some implementations, the SVC value automatically inserted by the SVC value adding unit 230 can also be updated by the user 104. In some implementations, the user 104 can only reduce the SVC value because the SVC value is set to be not greater than the payment amount or adjusted payment amount of the transaction between the user 104 and the merchant 106.

With the value of the SVC card inserted in, any incentive or discount corresponding to the value of the SVC card is also presented by the SVC interface 310. For example, the purchase price for the SVC card or the purchase price for the value added to the SVC card may be smaller than the card value or the value added to the SVC card.

The user 104 can confirm the purchase price and pay the purchase amount of the SVC card through the e-wallet 122 of the user 104. For example, the purchase price may be automatically drawn from a credit card or debit card linked to the e-wallet 122. In some implementations, the transaction on the SVC card is handled by the corresponding card issuer 108, 110 under a system or processing channel of the card issuer 108, 110. For example, the SVC interface 310 directly presents a site of the card issuer 108, 110 for the user 104 to deal with the card issuer 108, 110 on transacting the SVC card. In some implementations, the SVC interface 310 relays the transaction on the SVC card to the corresponding card issuer 108, 110.

After the user 104 has purchased the SVC card or added value to the SVC card, identification information and other information of the purchased SVC card or the existing SVC card with added value is shown or updated on the SVC interface 310.

In example operation 440, the SVC auto-application unit 240 causes to insert the identification information of the SVC card onto the merchant interface 312 for the SVC card to be used in the payment of the transaction between the user 104 and the merchant 106. In some implementations, the SVC auto-application unit 240 automatically inserts the identification information of the SVC card into proper section on the merchant interface 312. In some implementations, the SVC interface 310 provides a user selection, e.g., the "COPY" button 320 by the identification of the SVC card, for the user 104 to make a selection to insert the identification information of the SVC card onto relevant section on the merchant interface 312. A reminder message, e.g., a conversation window, may be presented, e.g., through the SVC interface 310 or the e-wallet 122, to remind the user to make the selection. A reminder message may also be presented to remind the user 104 that the SVC card will be revoked if it is not used or redeemed in a transaction between the user 104 and the merchant 106 within a set time limit.

In example operation 450, the SVC redemption verification unit 250 verifies whether the SVC card has been used or redeemed in the transaction between the user 104 and the merchant 106 within the time limit.

In example operation 460, the SVC revoking unit 260 revokes an SVC card in response to the SVC card not being used or redeemed in the transaction between the user 104 and the merchant 106 within the time limit. The revoking the SVC card includes presenting the revoked status of the SVC card on the SVC interface 310 and removing the identification information of the SVC card from the merchant interface 312. After the SVC card has been revoked, the initial payment amount used for the transaction of the SVC card is refunded back to the e-wallet 122 of the user 104. Any benefits or incentives corresponding to the transaction on the SVC card will also be revoked through the e-wallet 122.

In some implementations, if the user 104 returns the items purchased in the transaction with the merchant 106 using the SVC card, the refund will be made in the form of SVC card. The refunded SVC card may also be revoked if it is not used or redeemed within a time limit set for it.

The implementations of the present specification are described in a progressive way. For same or similar parts of the implementations, mutual references can be made to the implementations. Each implementation focuses on a difference from the other implementations. Particularly, apparatus, device, and medium implementations are basically similar to a method implementation, and therefore are described briefly. For related parts, references can be made to related descriptions in the method implementation. Details are omitted here for simplicity.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

In the 1990s, whether technology improvement was a hardware improvement (for example, improvement of a circuit structure, such as a diode, a transistor, or a switch) or software improvement (improvement of a method procedure) could be clearly distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed using the several described hardware description languages and is programmed into an integrated circuit.

A controller can be implemented using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include, but are not limited to, the following microprocessors: ARC 625D, Atmel AT91SAM, Microchip PIC18F26K20, and Silicon Labs C8051F320. The memory controller can also be implemented as a part of the control logic of the memory. A person skilled in the art also knows that, in addition to implementing the controller using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Alternatively, the device configured to implement various functions can even be considered as both a software module implementing the method and a structure in the hardware component.

The system, device, module, or unit illustrated in the previous implementations can be implemented using a computer chip or an entity, or can be implemented using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

For convenience of description, the above devices are described separately in terms of their functions. Certainly, functions of the units can be implemented in the same or different software or hardware when the present specification is implemented.

A person skilled in the art should understand that the implementations of the present specification can be provided as methods, systems, or computer program products. Therefore, the present specification can take a form of complete hardware implementations, complete software implementations, or implementations combining software and hardware. Further, the present specification can take a form of a computer program product implemented on one or more computer-usable storage media (including but not limited to disk storage, CD-ROM, and optical storage) containing computer-usable program code.

The present specification is described with reference to the flowcharts and/or block diagrams of the method, the device (system), and the computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of another programmable data processing device generate a device for implementing a specific function in one or more processes in the flowcharts and/or in one or more blocks in the block diagrams.

These computer program instructions can be stored in a computer readable memory that can instruct the computer or another programmable data processing device to work in a specific way, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or another programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random-access memory (RAM), a non-volatile memory, and/or another form that is in a computer readable medium, for example, a read-only memory (ROM) or a flash memory (flash RAM). The memory is an example of the computer readable medium.

The computer readable medium includes persistent, non-persistent, movable, and unmovable media that can store information using any method or technology. The information can be a computer readable instruction, a data structure, a program module, or other data. Examples of the computer storage medium include, but are not limited to, a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

It is also worthwhile to note that terms "include", "include" or any other variant is intended to cover non-exclusive inclusion, so that processes, methods, commodities or devices that include a series of elements include not only those elements but also other elements that are not explicitly listed, or elements inherent in such processes, methods, commodities or devices. An element described by "includes a . . . " further includes, without more constraints, another identical element in the process, method, product, or device that includes the element.

A person skilled in the art should understand that one or more implementations of the present specification can be provided as a method, a system, or a computer program product. Therefore, the implementations of the present specification can take a form of hardware implementations, software implementations, or both. Further, the implementations of the present specification can take a form of computer program products implemented on one or more computer-usable storage media (including but not limited to a disk storage device, CD-ROM, and an optical storage device) containing computer-usable program code.

The implementations of the present specification can be described in the general context of computer executable instructions executed by a computer, for example, a program module. Generally, the program module includes a routine, a program, an object, a component, a data structure, etc., executing a specific task or implementing a specific abstract data type. The implementations of the present specification can also be practiced in distributed computing environments. In the distributed computing environments, tasks are performed by remote processing devices connected through a communications network. In a distributed computing environment, the program module can be located in both local and remote computer storage media including storage devices.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of executing a payment transaction involving a stored value card (SVC) via a payment service provider, comprising:
  deploying a computing system, the computing system being electronically communicatively linked to a user computing device, a card issuer computing server, and a merchant computing terminal, the computing system including a server of the payment service provider and a database that stores SVC transactional relationships among a plurality of merchants and a plurality of SVC card issuers, and stores information of an e-wallet account of the user with the payment service provider;
  determining, by the computing system using the database, a stored value card of the card issuer that can be applied by the user as payment in a transaction between the user and the merchant based on an SVC transaction relationship between the merchant and the card issuer stored in the database;
  presenting, by the computing system, a first graphics interface on the user computing device for identifying the stored value card, the first graphics interface enabling including a payment transaction on the stored value card using the e-wallet account of the user with the payment system provider, wherein the first graphics interface includes:
    a field for an identification number of the stored value card,
    a field for a value of the stored value card, and
    a first user selection icon for inserting the identification number of the stored value card into a second graphics interface;
  presenting, by the computing system, the second graphics interface on the computing device of the user configured to be coupled to the first graphics interface for using the stored value card for payment in the transaction between the user and the merchant, wherein selection of the first user selection icon causes the identification number of the stored value card to be inserted onto the second graphics interface, and wherein the second graphics interface includes a second user selection icon for applying the stored value card to the transaction between the user and the merchant for payment to the merchant; and
  revoking the stored value card in response to determining the stored value card not being used or redeemed in the transaction between the user and the merchant within a threshold time limit.

2. The method of claim 1, comprising automatically inserting the value for the stored value card in the first graphics interface based on a payment amount of the transaction between the user and the merchant shown on the second graphics interface.

3. The method of claim 2, wherein the automatically inserting the value for the stored value card based on the payment amount of the transaction between the user and the merchant includes adjusting the payment amount by removing an impact on the payment amount of a factor in the transaction between the user and the merchant that conflicts with the stored value card.

4. The method of claim 1, wherein the causing the identification information of the stored value card to be inserted onto the second graphics interface includes automatically inserting the identification information of the stored value card onto the second graphics interface.

5. The method of claim 1, comprising setting the threshold time limit after the user has transacted on the stored value card through the first graphics interface.

6. The method of claim 1, wherein the presenting the first graphics interface includes providing a browser extension to a webpage of the second graphics interface.

7. The method of claim 1, wherein the presenting the first graphics interface includes providing a mini-program to the user computing device, the mini-program including a browser to access the second graphics interface and providing the first graphics interface through the mini-program.

8. A device, comprising:
a processor; and
  a memory having executable instructions stored thereon, the executable instructions, when executed by the processor, enabling the processor to implement acts of executing a payment transaction involving a stored value card (SVC) via a payment service provider including:
    deploying a computing system, the computing system being electronically communicatively linked to a user computing device, a card issuer computing server, and a merchant computing terminal, the computing system including a server of the payment service provider and a database that stores SVC transactional relationships among a plurality of merchants and a plurality of SVC card issuers, and stores information of an e-wallet account of the user with the payment service provider;
    determining, by the computing system using the database, a stored value card of the card issuer that can be applied by the user as payment in a transaction between the user and the merchant based on an SVC transaction relationship between the merchant and the card issuer stored in the database;
    presenting, by the computing system, a first graphics interface on the user computing device for identifying the stored value card, the first graphics interface enabling a payment transaction on the stored value card using the e-wallet account of the user with the payment system provider, wherein the first graphics interface includes:
a field for an identification number of the stored value card,
a field for a value of the stored value card, and
a first user selection icon for inserting the identification number of the stored value card into a second graphics interface;
presenting, by the computing system, the second graphics interface on the computing device of the user configured to be coupled to the first graphics interface for using the stored value card for payment in the transaction between the user and the merchant, wherein selection of the first user selection icon causes the identification number of the stored value card to be inserted onto the second graphics interface, and wherein the second graphics interface includes a second user selection icon for applying the stored value card to the transaction between the user and the merchant for payment to the merchant; and
revoking the stored value card in response to determining the stored value card not being used or redeemed in the transaction between the user and the merchant within a threshold time limit.

9. The device of claim 8, wherein the acts include automatically inserting the value for the stored value card in the first graphics interface based on a payment amount of the transaction between the user and the merchant shown on the second graphics interface.

10. The device of claim 9, wherein the automatically inserting the value for the stored value card based on the payment amount of the transaction between the user and the merchant includes adjusting the payment amount by removing an impact on the payment amount of a factor in the transaction between the user and the merchant that conflicts with the stored value card.

11. The device of claim 8, wherein the causing the identification information of the stored value card to be inserted onto the second graphics interface includes automatically inserting the identification information of the stored value card onto the second graphics interface.

12. The device of claim 8, wherein the acts include setting the threshold time limit after the user has transacted on the stored value card through the first graphics interface.

13. The device of claim 8, wherein the presenting the first graphics interface includes providing a browser extension to a webpage of the second graphics interface.

14. The device of claim 8, wherein the presenting the first graphics interface includes providing a mini-program to the user computing device, the mini-program including a browser to access the second graphics interface and providing the first graphics interface through the mini-program.

15. A non-transitory computer-readable storage medium having executable instructions stored thereon, which, when executed by a processor, configures the processor to implement acts of executing a payment transaction involving a stored value card (SVC) via a payment service provider comprising:
deploying a computing system, the computing system being electronically communicatively linked to a user computing device, a card issuer computing server, and a merchant computing terminal, the computing system including a server of the payment service provider and a database that stores SVC transactional relationships among a plurality of merchants and a plurality of SVC card issuers, and stores information of an e-wallet account of the user with the payment service provider;
determining, by the computing system using the database, a stored value card of the card issuer that can be applied by the user as payment in a transaction between the user and the merchant based on an SVC transaction relationship between the merchant and the card issuer stored in the database;
presenting, by the computing system, a first graphics interface on the user computing device for identifying the stored value card, the first graphics interface enabling a payment transaction on the stored value card using the e-wallet account of the user with the payment system provider, wherein the first graphics interface includes:
a field for an identification number of the stored value card,
a field for a value of the stored value card, and
a first user selection icon for inserting the identification number of the stored value card into a second graphics interface;
presenting, by the computing system, the second graphics interface on the computing device of the user configured to be coupled to the first graphics interface for using the stored value card for payment in the transaction between the user and the merchant, wherein selection of the first user selection icon causes the identification number of the stored value card to be inserted onto the second graphics interface, and wherein the second graphics interface includes a second user selection icon for applying the stored value card to the transaction between the user and the merchant for payment to the merchant; and
revoking the stored value card in response to determining the stored value card not being used or redeemed in the transaction between the user and the merchant within a threshold time limit.

16. The storage medium of claim 15, wherein the acts include automatically inserting a value for the stored value card in the first graphics interface based on a payment amount of the transaction between the user and the merchant shown on the second graphics interface.

17. The storage medium of claim 15, wherein the causing the identification information of the stored value card to be inserted onto the second graphics interface includes automatically inserting the identification information of the stored value card onto the second graphics interface.

18. The storage medium of claim 15, wherein the presenting the first graphics interface includes providing one of:
a browser extension to a webpage of the second graphics interface; and
a mini-program that includes a browser to access the second graphics interface and providing the first graphics interface through the mini-program.

19. The storage medium of claim 15, wherein the act include setting the threshold time limit after the user has transacted on the stored value card through the first graphics interface.

20. The storage medium of claim 15, wherein the presenting the first graphics interface includes presenting the first graphics interface that identifies a plurality of stored value cards, each of the plurality of stored value card is identified in the first graphics interface with:
a field for a card identification number,
a field for a card value, and a user selection icon for inserting the card identification number of the stored value card into the second graphics interface.

\* \* \* \* \*

UNITED STATES PATENT AND TRADEMARK OFFICE
CERTIFICATE OF CORRECTION

| | | |
|---|---|---|
| PATENT NO. | : 11,481,758 B1 | Page 1 of 1 |
| APPLICATION NO. | : 17/501912 | |
| DATED | : October 25, 2022 | |
| INVENTOR(S) | : Zhujie Liu | |

It is certified that error appears in the above-identified patent and that said Letters Patent is hereby corrected as shown below:

In the Claims

<u>Column 17, Claim 1, Line 52:</u>
"enabling including a payment transaction"
Should read:
--enabling a payment transaction--.

Signed and Sealed this
Thirty-first Day of December, 2024

Derrick Brent
*Acting Director of the United States Patent and Trademark Office*